(12) United States Patent
Nieminen

(10) Patent No.: US 8,112,122 B2
(45) Date of Patent: Feb. 7, 2012

(54) MOBILE COMMUNICATION TERMINAL HAVING A CONTEXT SENSITIVE KEYPAD AND METHOD THEREOF

(75) Inventor: Mika Nieminen, Espoo (FI)

(73) Assignee: Nokia Corporation, Espoo (FI)

( * ) Notice: Subject to any disclaimer, the term of this patent is extended or adjusted under 35 U.S.C. 154(b) by 913 days.

(21) Appl. No.: 11/384,212

(22) Filed: Mar. 17, 2006

(65) Prior Publication Data

US 2007/0218956 A1 Sep. 20, 2007

(51) Int. Cl.
*H04B 1/38* (2006.01)
*H04W 88/02* (2009.01)

(52) U.S. Cl. ..................................................... 455/566

(58) Field of Classification Search ........................ None
See application file for complete search history.

(56) References Cited

U.S. PATENT DOCUMENTS

| 2004/0142720 A1* | 7/2004 | Smethers .................... 455/550.1 |
| 2005/0197763 A1* | 9/2005 | Robbins et al. ................ 701/200 |

OTHER PUBLICATIONS

*User Guide for Nokia 3230*, Copyright 2005 Nokia., pp. 1-210, http://www.nokia.com/phones/declaration_of_conformity/.

* cited by examiner

*Primary Examiner* — Philip Sobutka
(74) *Attorney, Agent, or Firm* — Alston & Bird LLP

(57) ABSTRACT

A mobile communication apparatus comprising a numeric keypad is disclosed, wherein a number of functions are associated with keys of said keypad. The functions are related to a context of a present application running on said mobile communication apparatus, and associated with one or more further applications, wherein actuation of any of said keys results in activation of any of said one or more further functions to perform said related function by said associated applications.

13 Claims, 4 Drawing Sheets

MOBILE COMMUNICATION TERMINAL HAVING A CONTEXT SENSITIVE KEYPAD AND METHOD THEREOF

FIELD OF THE INVENTION

Embodiments of the present invention relate to a mobile communication apparatus and a method for the mobile communication apparatus. In particular, embodiments of the present invention relates to providing functions related to a present context of the mobile communication apparatus, wherein the functions can be directly activated by actuating keys of a keypad of the mobile communication apparatus.

BACKGROUND OF THE INVENTION

A problem with mobile communication apparatuses, which nowadays comprise a huge number of applications, functions, and features, is that a large number of functions are to be controlled with a very limited number of input means, i.e. keys, rotating input means, joystick, etc. This is normally coped with by using a menu system, where functions are accessed by navigating a menu system, normally hierarchical. However, for functions that are used often, and especially when functions are to be used together with other functions, the menu approach is not satisfactory for the user. Therefore, there is a need for an improved approach to handle the applications, functions, and features of the mobile communication apparatus.

SUMMARY OF THE INVENTION

In view of the above, an objective of one embodiment of the invention is to solve or at least reduce the problems discussed above. In particular, an objective is to provide a cross application interface.

According to a first aspect of the present invention, there is provided a mobile communication apparatus comprising a numeric keypad, wherein a number of functions are associated with keys of said keypad, wherein at least one of the functions is related to a context of a present application running on said mobile communication apparatus, and associated with one or more further applications, wherein actuation of any of said keys results in activation of any of said functions to perform said related function by said one or more further associated applications.

This enables a fast access to functions of the mobile communication apparatus during use of an application.

The mobile communication apparatus may further comprise a display arranged to display said associations of said functions to said keys. The display may be arranged to display said associations upon user interaction, or to display said associations after a pre-determined time after said context has been present.

This helps a user of the mobile communication apparatus to use the directly accessible functions.

The displayed associations may comprise an image with identifications of said functions on an image of said numeric keypad.

The relations of said functions to said context and/or the associations of said functions to said applications may be user configurable.

This enables the user to customize the mobile communication to personal needs, and thereby further improving handling of the mobile communication apparatus.

According to a second aspect of the present invention, there is provided a method for a mobile communication apparatus having a numeric keypad, comprising the steps of:
determining a present context of an application running on said mobile communication apparatus;
determining functions related to said context, wherein at least one of said functions are associated to one or more applications, respectively, and wherein said functions are associated with keys of said keypad;
detecting actuation of one key of said keys; and
activating a function related to said one key by said associated applications.

If said mobile communication apparatus comprises a display, the method may further comprise the steps of determining a user interaction; and
upon said user interaction performing the step of displaying an image representing said functions, wherein said image indicates association to keys of said numeric keypad. Alternatively, the method may further comprise the step performing the step of displaying an image representing said functions after a pre-determined time after said step of determining said present context, wherein said image indicates association to keys of said numeric keypad.

The method may further comprise the step of configuring said association between said functions and said keys, respectively, and/or the step of configuring said association between said functions and said applications, respectively.

The advantages of the second aspect of the present invention are essentially the same as the first aspect of the present invention.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
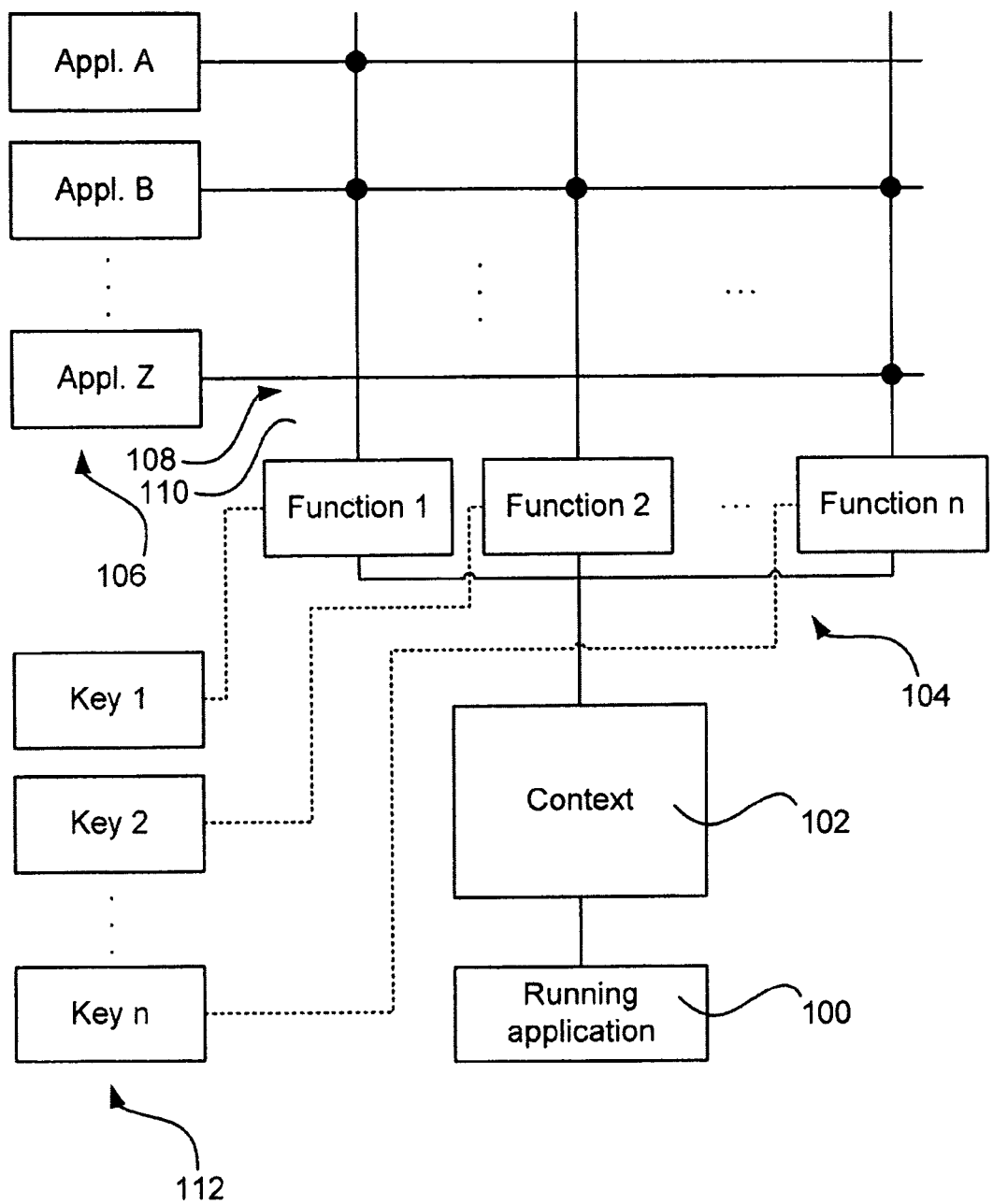
FIG. 1 illustrates a principle of an embodiment of the present invention.

FIG. 1 illustrates a principle of an embodiment of the present invention. An application 100 is running on a mobile communication apparatus, e.g. a telephone call, a phone book, a calendar, a browser, etc., and depending on the context 102 of the running application 100, i.e. the state caused by program code of the mobile communication apparatus, user interaction, interaction with a telecommunication network, etc., different functions 104 are available to a user by relation to keys of a keypad of the mobile communication apparatus. Each of the functions 104 are associated to one or more applications 106, which are different than the application 100 and are activated to perform the associated function. FIG. 1 illustrates the associations between functions and applications by dots 108 in an array 110 formed by said functions 104 and applications 106. FIG. 1 further illustrates associations between the functions 104 and keys 112 by dashed lines. Note that FIG. 1 should be interpreted as an abstract illustration of the principle, and therefore, the lines and dots should not be interpreted as electrical connections between elements.

The associations between functions 104 and keys 112 can be user-configurable, i.e. a user is able to determine which function to be associated with which key. The associations between the functions 104 and the applications 106 are normally given by the nature of the function and the abilities of the applications, but here, user-configurability is also possible, especially when more than one application is able to contribute to the implementation of a function. The user-configurability will enable a user to customize its mobile communication apparatus for best match to personal needs.

The relations between a context 102 and a plurality of functions 104, and associations between the functions 104, applications 106, and keys 112 can be implemented in a multitude of ways. With reference to FIGS. 2-4, a number of examples will be provided, but a large number of further examples is possible to carry out the present invention.

Figure 2A:
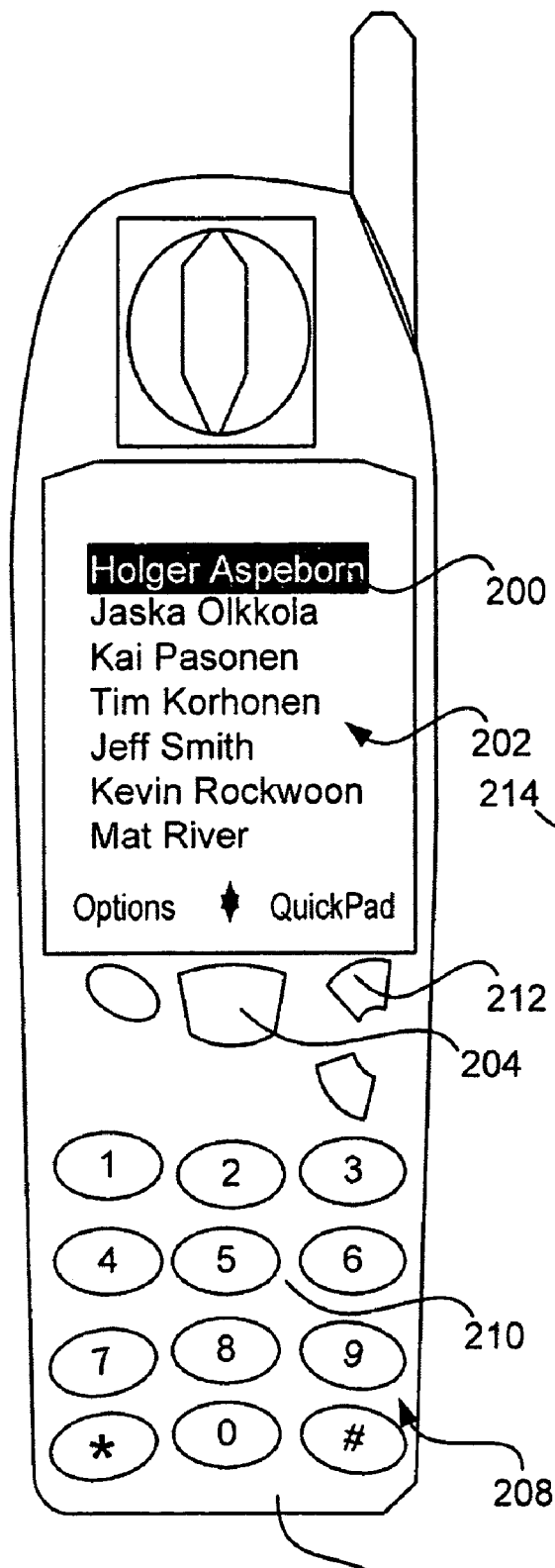
FIGS. 2-4 illustrates examples where an embodiment of the invention is used for improving handling of a mobile communication apparatus.
Figure 2B:
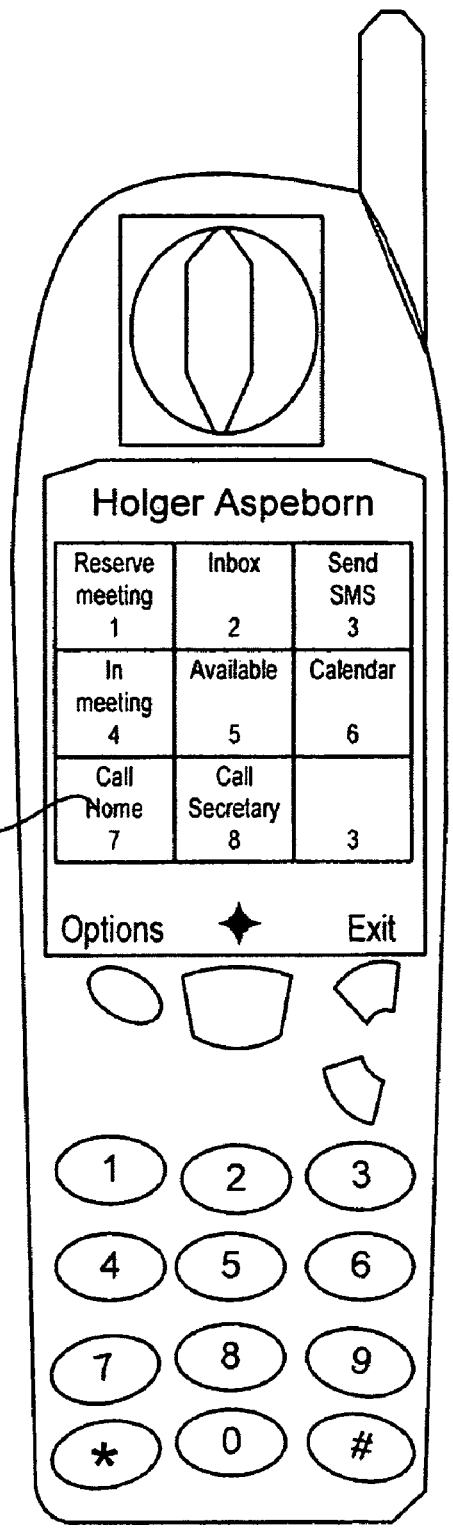

FIG. 2a illustrates an example where a running application is a contact application, e.g. a phone book, where a contact 200 is chosen from a plurality of contacts 202, e.g. by a navigation key 204 on a mobile communication apparatus 206. Here, a context occurs, where several possible alternatives for the chosen contact 200 are possible. This can for example be booking a meeting with the contact, looking for messages from the contact in an inbox of the mobile communication apparatus 206, sending a message to the chosen contact 200, or calling the contact 200 or anyone associated with the contact 200, e.g. the contact's secretary. Also functions not directly associated with the contact 200 itself, but with more general communication features, such as setting the mobile communication apparatus 206 in an "in meeting" or "available" state, can be related to the context. These functions are automatically available on keys 208 on a numeric keypad 210 of the mobile communication apparatus 206. As discussed above, the relations and associations can be pre-defined by a user, or pre-defined according to default rules provided by the mobile communication apparatus 206. The associations between the functions and the keys 208 of the numeric keypad 210 may be difficult to remember for a user, e.g. when the context is not frequently occurring, and/or when a user is learning how to use the features according to an embodiment of the present invention. In those cases, the user can activate a viewing function, e.g. by pressing a soft key 212 associated with the viewing function, to get a view 214 of the associations between the functions and the keys as depicted in FIG. 2b. The view can be an image of the numeric keypad with a name, symbol, or short description of the function inserted, such that the user knows which key to press for activating the function. Upon pressing one of the numeric keys 208, the function, and thus its associated one or more applications are activated, and parameters present from the running application and its context can be used as input parameters for the activated applications. Thereby, a seemingly seamless cross application interface, that is intuitive to the user, is provided.

Figure 3A:
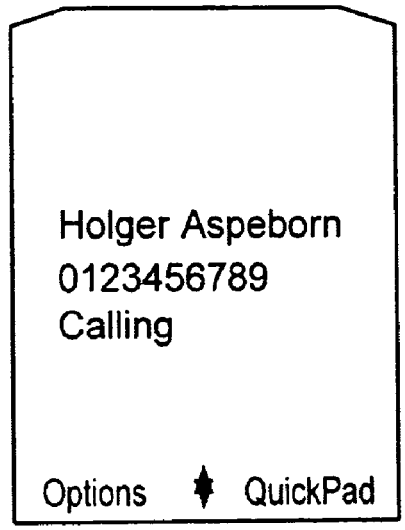
Figure 3B:
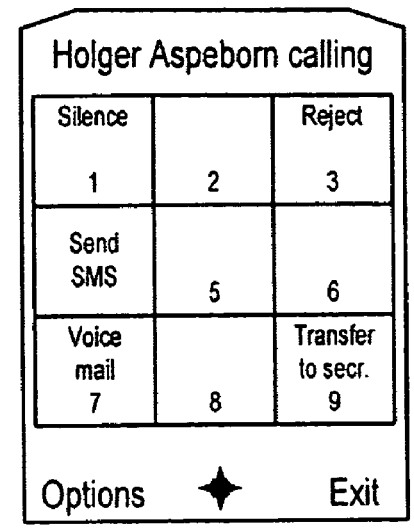

FIG. 3a illustrates a screen view of a mobile communication apparatus in another context, here when an incoming call is presented on the screen by presenting the name of the caller, since the name was present in a phone book, and the telephone number of the caller. The user then normally has a number of options: answer the call, reject the call, or silence the buzzer without answering the call. The user could also send a message to the caller, or send the call to a voice mail function, or to another recipient, e.g. a secretary. These options can now be defined in functions related to the context, associated with applications performing the functions, and associated with keys of a numeric keypad of the mobile communication apparatus, where the user e.g. only presses key "9" to direct the call to a secretary. Similar to what is described with reference to FIG. 2b, the user can upon interaction, or automatically, e.g. after a predetermined time, get a view of the associations between the functions and the keys, as depicted in FIG. 3b.

Figure 4A:
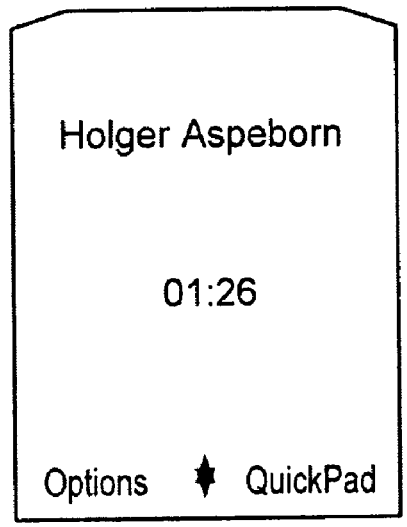
Figure 4B:
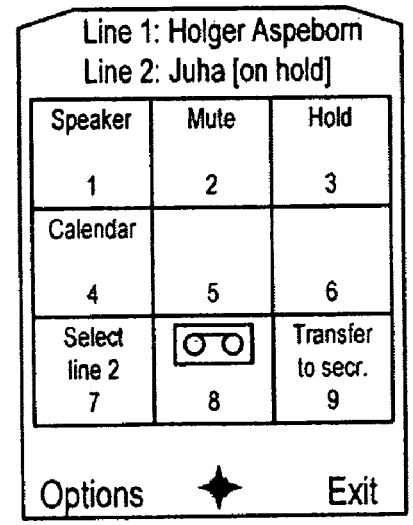

FIG. 4a illustrates a screen view of a mobile communication apparatus in a further context, here with an ongoing call, which may be presented by the name of the calling party and elapsed time. In this context, the user could have some options, e.g. switching to speaker phone, muting input, putting the call on hold, opening a calendar application, switching to another line, transferring the call to another recipient, etc. These options can be defined as functions, as described above. Similarly as described above, a view of the associated functions and keys can be presented, as depicted in FIG. 4b.

With reference to FIGS. 2-4, running applications with different contexts have been described, where FIG. 2 relates to a user initiated action rendering in a certain context, FIG. 3 relates to an action initiated from outside, here a calling party, rendering in another context, and FIG. 4 relates to a further context being related to an ongoing session in an application. Thereby, the occurrence of contexts due to different occasions have been illustrated. The running applications described have been chosen as ordinary telephone applications for the sake of easy understanding. However, the running application to which the context relates can be any application that can be executed on a mobile communication apparatus, such as messaging, browsing, media playing and recording, navigation, data communication, etc. It has been described that each context has its own unique set of functions and keys associated to these. However, some functions may be present in a wide range of contexts, and some may be present in all. In those cases, it can be preferable that the same key is associated to the same function for these contexts.

Figure 5:
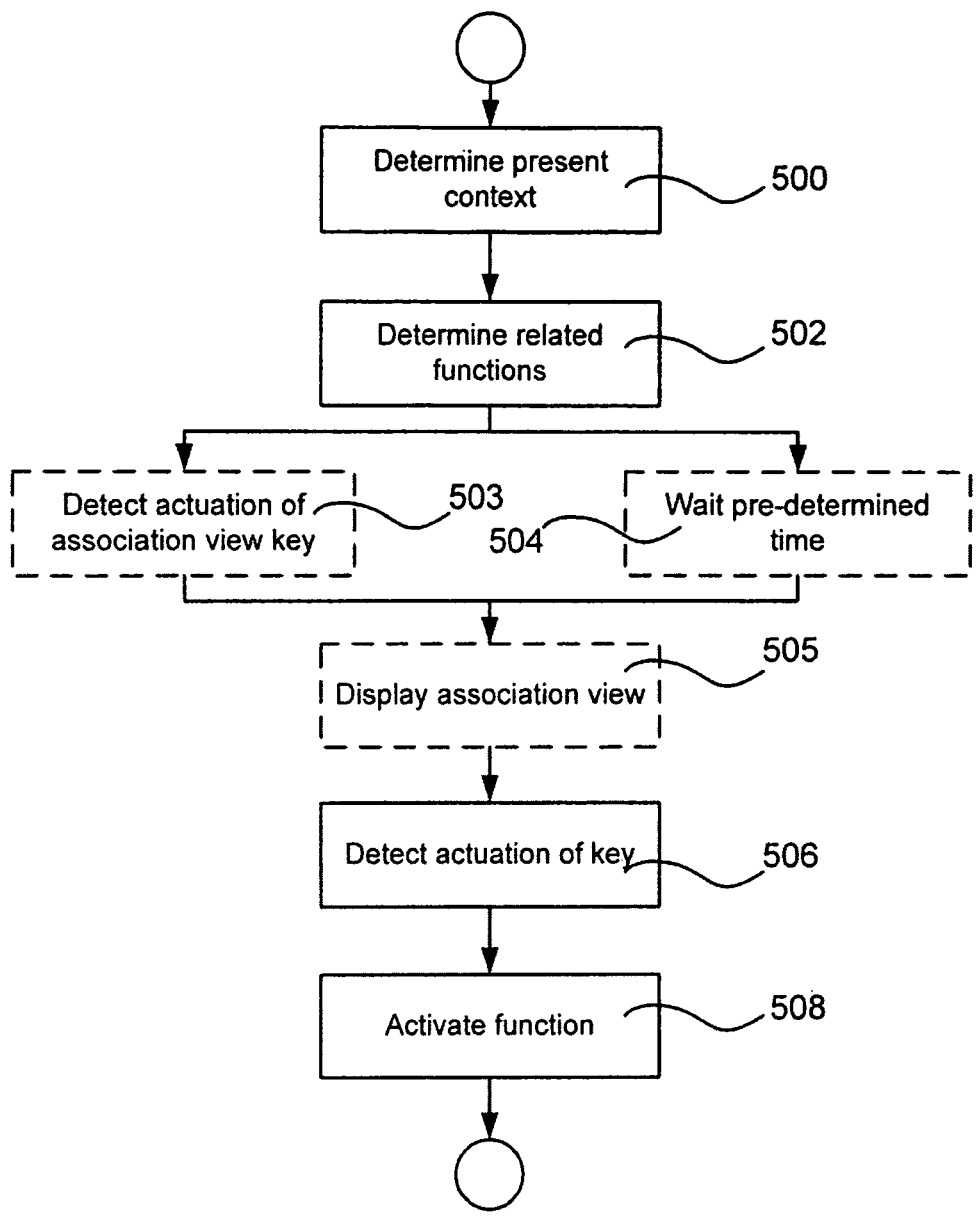
FIG. 5 is a flow chart illustrating a method according to an embodiment of the present invention.

FIG. 5 is a flow chart illustrating a method according to an embodiment of the present invention. In a context determination step 500, a present context of a running application is determined in a mobile communication apparatus. In a function determination step 502, functions related to the context are determined, wherein the functions are related to keys of a keypad of the mobile communication apparatus. Thereby, upon detection of actuation of any of the keys of the keypad in a key actuation detection step 506, the related function to the key is activated in a function activation step 508. Upon detection of actuation of a certain key, preferably a soft key, i.e. a key with adaptive function determined by a user interface of the mobile communication apparatus, in an optional view key actuation detection step 503, a view of associations between the keys of the keypad and the functions of the present context is viewed in an optional association viewing step 505. Alternatively, the optional association viewing step 505 can be performed after a step 504 of waiting a predetermined time after the context determination step 500 is performed.

Figure 6:
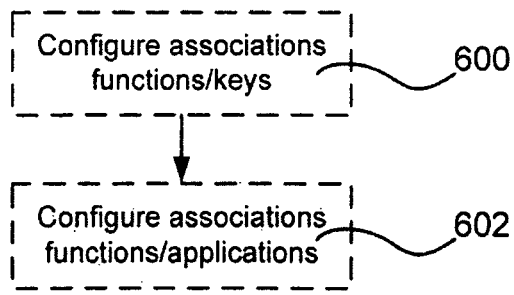
FIG. 6 is a flow chart illustrating optional steps for a method according to an embodiment of the present invention.

FIG. 6 is a flow chart illustrating optional steps of a method according to an embodiment of the present invention, which provides the steps described above with reference to FIG. 5. The optional steps can comprise a step 600 of configuring an association between the functions and the keys, and/or a step 602 of configuring an association between the functions and the applications.

As described above, during the course of execution of an application, a user could cause various functions to be performed by actuating respective keys of the numeric keypad with the particular functions that are associated with the numeric keys being dependent upon the application currently being executed. While the mobile communication apparatus may be configured such that any actuation of the keys during the execution of an application causes the particular functions to be performed, a mobile communication apparatus of another embodiment requires that the user first take a step to activate the keys during execution of the application before the actuation of the keys causes the particular functions to be performed. While the keypad may be activated in different manners, the mobile communication apparatus of one embodiment requires a user to first actuate a predefined softkey in order to activate the keys. After actuating the predefined softkey, the user can then actuate a key on the keypad in order to cause the respective function to be performed, such as by launching and executing the application with which the function is associated. By requiring the user to first take some action during execution of the application, such as by actuating a predefined softkey, prior to activating the keys, the mobile communication apparatus avoids accidental activation of a key and the corresponding accidental performance of the associated function. For example, the requirement of the user to take some action during execution of the application in order to activate the keys advantageously prevents a user from accidentally actuating a key when the user picks up the mobile communications device to respond to an incoming call.

The foregoing method(s), including those set forth in FIGS. 5 and 6, can be implemented in various manners, but are typically implemented by means of computer program instructions stored in a memory device of the mobile communication apparatus and executable by a processor or other processing element of the mobile communication apparatus.

The embodiments of the invention have mainly been described above with reference to a few embodiments. However, as is readily appreciated by a person skilled in the art, other embodiments than the ones disclosed above are equally possible within the scope of the invention, as defined by the appended patent claims.

That which is claimed:

1. An apparatus comprising:
a processor; and
a memory storing executable instructions that when executed by the processor cause the apparatus to at least perform the following:
receiving input from keys of a numeric keypad with the input indicative of a respective function, wherein a number of functions are associated with keys of said keypad, wherein at least one of the functions is related to a context of a present application running on said apparatus, said apparatus being a component of a communications device and at least one of the functions being communications functions, and associated with one or more further applications wherein receiving input resulting from actuation of any of said keys results in activation of any of said functions to perform said related function by said one or more further associated applications;
providing for displaying an association view, wherein the association view displays the context-related functions in a positional relationship with the keys of the keypad such that each function is displayed at a location that positionally corresponds to the associated key of the keypad; and
providing for displaying said association view only after user interaction that includes selecting the association view.

2. The apparatus according to claim 1, wherein said processor is configured to provide for displaying said associations view after a pre-determined time after said context has been present.

3. The apparatus according to claim 1, wherein said displayed associations view comprises an image with identifications of said functions on an image of said numeric keypad.

4. The apparatus according to claim 1, wherein said relations of said functions to said context are user configurable.

5. The apparatus according to claim 1, wherein said associations of said functions to said applications are user configurable.

6. The apparatus according to claim 1, further comprising a softkey configured such that the actuation of the softkey causes the functions to be associated with the keys of said keypad.

7. The apparatus according to claim 1 wherein providing for displaying comprises providing for displaying a representation of a key including both the function associated with the key and a numerical designation associated with the key.

8. A method, comprising:
determining a present context of an application running on a mobile communication apparatus;
determining functions related to said context, wherein at least one of said functions is a communications function and is associated to one or more applications, and wherein said functions are associated with keys of a keypad of the mobile communication apparatus;
providing for displaying an association view, wherein the association view displays the context-related functions in a positional relationship of the keys of the keypad such that each function is displayed at a location that positionally corresponds to the associated key of the keypad;
determining a user interaction;
only after user interaction including selection of the association view, providing for the displaying of the association view;
detecting actuation of one key of said keys; and
activating a function related to said one key by said associated applications.

9. The method according to claim 8, wherein said mobile communication apparatus comprises a display, the method further comprising providing for displaying representations of said functions after a pre-determined time after determining said present context, wherein said displaying indicates associations to keys of said numeric keypad.

10. The method according to claim 8, further comprising configuring said association between said functions and said keys, respectively.

11. The method according to claim 8, further comprising configuring said association between said functions and said applications, respectively.

12. The method according to claim 8, further comprising actuating a softkey to cause the function to be associated with the keys of the keypad.

13. The method according to claim 8 wherein providing for displaying comprises providing for displaying a representation of a key including both the function associated with the key and a numerical designation associated with the key.

* * * * *

UNITED STATES PATENT AND TRADEMARK OFFICE
CERTIFICATE OF CORRECTION

| | | |
|---|---|---|
| PATENT NO. | : 8,112,122 B2 | Page 1 of 1 |
| APPLICATION NO. | : 11/384212 | |
| DATED | : February 7, 2012 | |
| INVENTOR(S) | : Nieminen | |

It is certified that error appears in the above-identified patent and that said Letters Patent is hereby corrected as shown below:

Column 6,
Lines 22, 23, and 26, "associations", both occurrences, should read --association--.

Signed and Sealed this
Fourth Day of December, 2012

David J. Kappos
*Director of the United States Patent and Trademark Office*